United States Patent [19]

Leonard et al.

[11] Patent Number: 5,616,837
[45] Date of Patent: Apr. 1, 1997

[54] FUEL LINE PRESSURE TEST

[75] Inventors: Michael D. Leonard, Sterling Heights; James C. Murphy, Livonia, both of Mich.

[73] Assignee: Ford Motor Company, Dearborn, Mich.

[21] Appl. No.: 254,736

[22] Filed: Jun. 6, 1994

[51] Int. Cl.[6] .................................................. G01M 15/00
[52] U.S. Cl. .......................................... 73/119 A; 73/117.2
[58] Field of Search ................................... 73/116, 119 A, 73/49.7, 40, 117.2; 364/431.05

[56] References Cited

U.S. PATENT DOCUMENTS

| 3,245,254 | 4/1966 | Mayer | 73/119 A |
|---|---|---|---|
| 4,037,467 | 7/1977 | Emerson | 73/119 A |
| 4,055,995 | 11/1977 | Armstrong et al. | 73/116 |
| 4,145,932 | 3/1979 | Pagel | 73/753 |
| 4,174,637 | 11/1979 | Mulzet et al. | 73/730 |
| 4,192,179 | 3/1980 | Yelke | 73/119 A |
| 4,311,043 | 1/1982 | Reid et al. | 73/119 A |
| 4,319,481 | 3/1982 | Yelke | 73/119 A |
| 4,333,338 | 6/1982 | Patey et al. | 73/119 A |
| 4,404,847 | 9/1983 | Larson | 73/119 A |
| 4,428,228 | 1/1984 | Banzhaf et al. | 73/119 A |
| 4,788,858 | 12/1988 | Liebermann | 73/119 A |
| 4,798,084 | 1/1989 | Takahashi et al. | 73/119 A |
| 4,977,872 | 12/1990 | Hartopp | 123/198 A |
| 5,020,362 | 6/1991 | Hart et al. | 73/119 A |
| 5,183,078 | 2/1993 | Sorrell | 73/40.5 R |
| 5,195,362 | 3/1993 | Eason | 73/49.7 |
| 5,197,435 | 3/1993 | Mazur et al. | 123/456 |
| 5,212,979 | 5/1993 | Albrodt et al. | 73/40 |
| 5,357,792 | 10/1994 | Getseby | 73/119 A |

Primary Examiner—Richard Chilcot
Assistant Examiner—Eric S. McCall
Attorney, Agent, or Firm—David B. Kelley

[57] ABSTRACT

A method for testing fuel line integrity and flow volume in a fuel injected internal combustion engine includes the steps of turning on a fuel pump connected to a fuel supply line with the engine's fuel injectors closed so as to pressurize fuel within the fuel line to a static condition, measuring fuel system pressure in the static condition, comparing the static condition fuel system pressure with a range of predetermined static pressures for an unobstructed fuel line, opening all fuel injectors to allow fuel flow through the fuel injectors such that the fuel system is in a fully loaded condition, measuring fuel system pressure in the fully loaded condition, and comparing the fully loaded condition fuel system pressure with a range of predetermined fully loaded pressure for an unobstructed fuel line. The test can be performed without breaking the fuel line and with a minimal number of hardware components, including a communication cable, a pressure transducer, a power source, an electronic computer and video display terminal. The system for performing the test includes a processor for giving timed commands to a fuel injected apparatus, a transducer for sensing the response of the fuel injected apparatus to the timed commands, and a comparator for comparing the results of the commands, as sensed by the transducer, to predetermined values for a similar unobstructed fuel injection apparatus, so as to determine the condition of the fuel injection apparatus.

7 Claims, 4 Drawing Sheets

FUEL LINE PRESSURE TEST

FIELD OF THE INVENTION

The present invention relates to automotive fuel systems and, more particularly, to a method for testing fuel line flow volume and integrity in a fuel injected internal combustion engine.

BACKGROUND OF THE INVENTION

For smooth operation, internal combustion engines require a continual metered flow of fuel from the fuel storage tank to the cylinders under varying engine demands from idle to wide open throttle. Various fuel system designs have evolved to provide such flow. Many systems employ a fuel pump and fuel pressure regulator to maintain sufficient fuel pressure in the fuel line for delivery to fuel metering devices. The fuel metering devices then selectively meter out fuel to the cylinders for combustion therein.

Many fuel systems utilize fuel injectors to meter fuel to the cylinders. The quantity of fuel metered into the cylinders can be accurately controlled by a Powertrain Control Module (PCM) by varying the injector pulse-width assuming a known constant fuel pressure between the fuel feed side of the fuel injector and the discharge side thereof. During high fuel demands, a constant pressure may not be sustained in the fuel rail, which conducts fuel to the fuel injectors, thus reducing flow of fuel to the cylinders. Should the flow of fuel to the cylinders be interrupted or reduced, the engine may run rough or stall.

In order to prevent such an event, or to assist in diagnosing engine trouble, the fuel system can be tested under dynamic and static conditions, and several such tests exist for that purpose. However, some tests require disassembly of the fuel line, while others require separate fuel reservoirs, injector drivers, or fuel system simulation equipment. These requirements necessitate specialized tools and take an inordinate amount of time to perform. In addition, some tests have used suspect, and even erroneous, methods for identifying fuel system flow reduction and restrictions. Such methods may result in false problem detection, possibly leading to unnecessary, expensive repairs.

It is an object of the present invention to provide a method for testing adequate fuel system delivery which can be quickly and accurately accomplished without false problem detection.

Another object is to provide a method for testing fuel system delivery which can be safely accomplished with a minimum number of hardware requirements.

It is an advantage of the present invention that a test according to the present invention may be accomplished without starting the engine and without breaking the fuel line, thus allowing a service technician to more quickly and conveniently inspect the fuel line.

Another advantage of the present invention is that a minimum of accessories, including a pressure transducer, a communication cable, a stand alone computer, and a power source, are required to perform the test.

A feature of the present invention is the use of vehicle specific fuel system pressure calibration data for comparison with measured fuel system pressures.

SUMMARY OF THE INVENTION

The above objects, advantages, and features of the present invention are accomplished by providing a method for testing fuel line flow volume and integrity in a fuel injected internal combustion engine, without breaking the fuel line, comprising the steps of turning on a fuel pump connected to the fuel line with the engine fuel injectors closed so as to pressurize fuel within the fuel line to a static condition, measuring fluid pressure within the fuel line in the pressurized static condition, comparing the measured static condition fuel line pressure with a predetermined static pressure for an unobstructed fuel line, opening all fuel injectors to allow fuel flow through the fuel injectors such that the fuel system is in a fully loaded condition, measuring fuel line pressure in the fully loaded condition, and comparing the fuel line pressure while operating in the fully loaded condition with a predetermined fully loaded pressure for an unobstructed fuel line.

The fully loaded condition fuel line pressure is measured approximately 0.3 seconds to 0.7 seconds, and preferably 0.5 seconds, after opening all fuel injectors. A pressure transducer is preferably connected to a fuel line valve connection, such as a Schrader valve, and the sensing pressure signal is sent to an electronic computer for processing and display on a video display terminal (VDT) along with a predetermined range of static fuel line pressures and fully loaded fuel line pressures for an unobstructed fuel line in a same model engine.

The steps of a preferred method include downloading control code from an electronic computer, external to the engine, to an engine control processor mounted on the vehicle. The processor is capable of controlling a fuel pump and the fuel injectors according to the control code during testing of the fuel line. Running of the control code within the engine control processor is initiated by sending a signal from the electronic computer external to the engine to the processor, at which time the control code instructs the processor to turn on the fuel pump connected to the fuel line with the engine fuel injectors closed so as to pressurize fuel within the fuel line to a static condition. Fluid pressure within the fuel line in the pressurized, static condition measured and a signal representing the measured static condition pressure is sent to the electronic computer. The measured static condition pressure value and a range of predetermined static pressures for an unobstructed fuel line in a same model engine are displayed, preferably on a VDT. A comparison can then be made between the static condition fuel system pressure and the range of predetermined static pressures for an unobstructed fuel line in a same model engine. All the fuel injectors are then opened simultaneously to allow fuel flow therethrough such that the fuel system is in a fully loaded condition. Fluid pressure within the fuel line in the fully loaded condition is measured approximately 0.3 seconds to 0.7 seconds after opening all fuel injectors and a signal representing the measured fully loaded condition pressure is sent to the electronic computer. The fully loaded condition fuel line pressure and a range of predetermined fully loaded pressures for an unobstructed fuel line in a same model engine are then displayed, preferably on a VDT in proximity to the prior displayed static condition pressure value and range of predetermined static pressures. Finally, the fully loaded condition fuel line pressure is compared with the range of predetermined fully loaded pressures for an unobstructed fuel line in a same model engine.

The system for performing the test includes a computer for giving timed commands to a fuel injected apparatus, a transducer for sensing the response of the fuel injected apparatus to the timed commands, and a comparator for comparing the results of said commands, as sensed by said transducer, to predetermined values for a similar unobstructed fuel injection apparatus, so as to determine the condition of the fuel injection apparatus. The comparator may include, for example, the computer used to give timed commands in conjunction with a VDT for displaying measured apparatus pressures along with predetermined values for an unobstructed fuel injection apparatus.

DETAILED DESCRIPTION OF THE PREFERRED EMBODIMENTS

Figure 1:
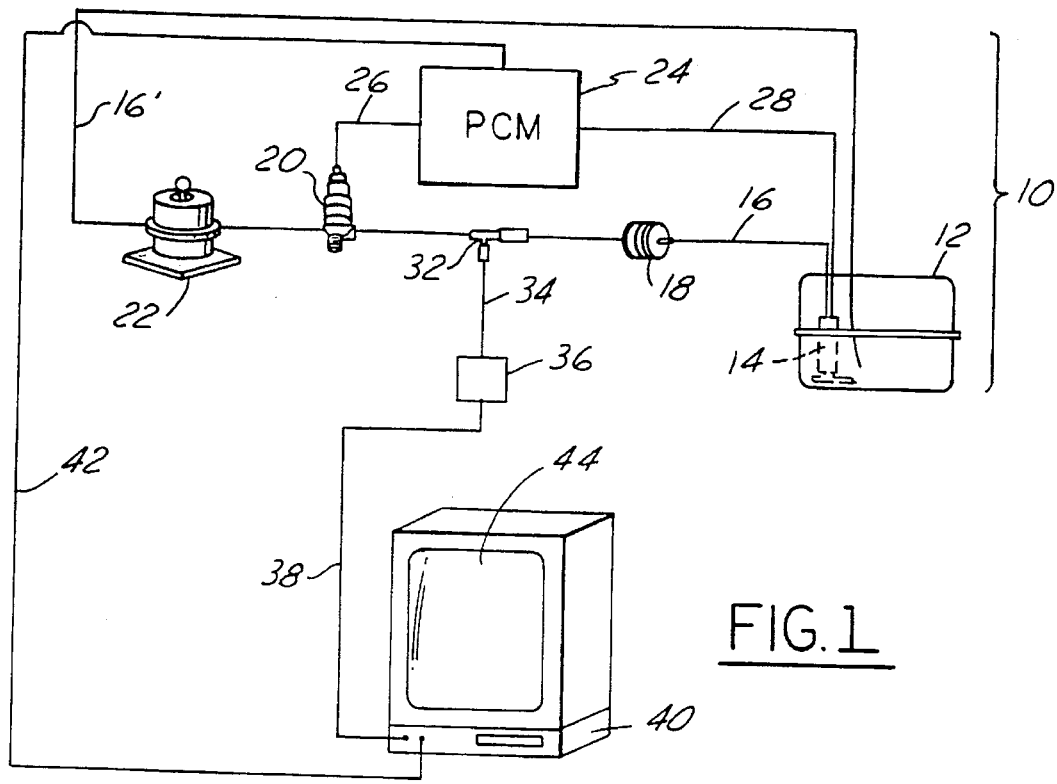
FIG. 1 is a schematic drawing of a fuel delivery system and testing apparatus for performing the method of testing fuel line integrity of the present invention.

Referring now to FIG. 1, a schematic diagram illustrates the apparatus used to conduct a fuel line integrity test according to the present invention. A fuel system 10 has a fuel tank 12 with fuel pump 14 mounted therein. Fuel pump 14 pumps fuel from tank 12 through fuel line 16 which passes through fuel filter 18 before being routed to a fuel rail (not shown). For the sake of simplicity, a single fuel injector 20 is shown in FIG. 1, but those skilled in the art will appreciate that a bank of fuel injectors emanates from the fuel rail, typically having a single fuel injector per engine cylinder. The system illustrated in FIG. 1 is a return fuel system wherein unused fuel in routed back to fuel tank 12. A fuel pressure regulator 22 is located on the return side 16' of fuel injector 20 to maintain a relatively constant fuel pressure within fuel line 16. After passing through pressure regulator 22, fuel is returned to tank 12.

Fuel injector 20 is controlled by a Powertrain Control Module (PCM) 24, through injector control line 26. PCM 24 also controls fuel pump 14 through fuel pump control line 28.

Figure 2:
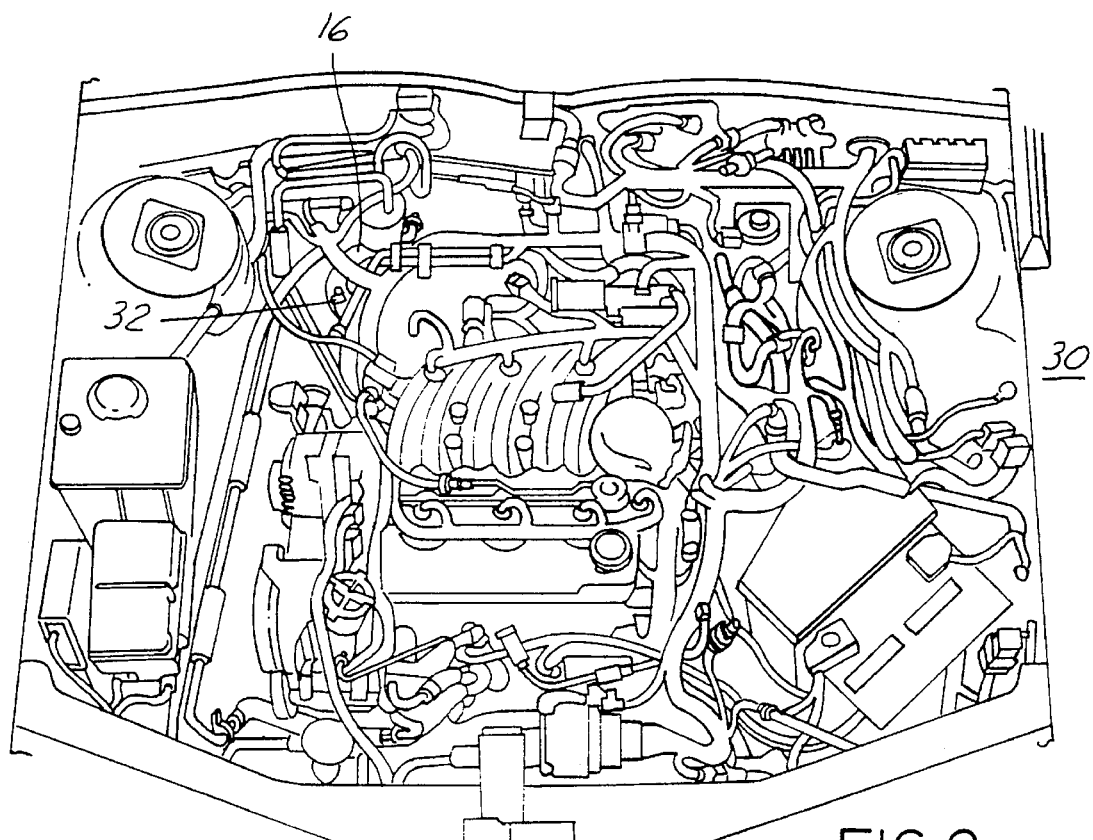
FIG. 2 is a top view of an engine compartment of a vehicle showing the tight packaging of vehicle components in the underhood area of modern day vehicles.

Still referring to FIG. 1, the testing of fuel line 16 according to the present invention is accomplished with minimal external parts and connections to the engine (not shown). It is important to reduce the number of parts and connections attached to the engine to simplify the task for the service technician and to allow quick and easy conduct of the test. As illustrated in FIG. 2, many current engine designs crowd as many components as possible within a limited size engine compartment 30. With such tight compaction, disassembly of fuel line 16 would be difficult and time consuming. As such, fuel line 16 incorporates a connection valve 32, preferably a Schrader valve, between fuel pump 14 and fuel injector 20 (FIG. 1). Valve 32 allows easy connection of a pressure line 34 which connects Schrader valve 32 with a pressure sensing device, such as transducer 36. Transducer 36 converts the sensed pressure into an electrical signal and sends that signal along line 38 to electronic computer 40, which is not part of the vehicle.

Computer 40 also is connected to PCM 24 via line 42 to allow communication therebetween as discussed below. A single line 42 is shown for simplicity despite use of two lines on some vehicles, a data line and a control line. Attached also to computer 40 is a video display terminal (VDT) 44 which, as further described below, graphically displays the results of the test of the current invention.

Computer 40 contains a set of executable microprocessor instructions capable of being used by PCM 24 to control both fuel pump 14 and fuel injector 20. As will be appreciated by those skilled in the art, "control" of fuel pump 14 means that PCM 24 sends a signal to turn on, or turn off, fuel pump 14. Likewise, PCM 24 can send a signal on line 26 to either open or close fuel injector 20. Utilization of such signals is well known in the art.

In operation, a vehicle (not shown) is moved into proximity with computer 40 and VDT 44. Transducer 36 is attached to valve 32 and to computer 40, as described above (FIG. 1). In addition, computer 40 is connected to PCM 24. The vehicle's engine need not be running in order to conduct the fuel line integrity test.

Figure 3:
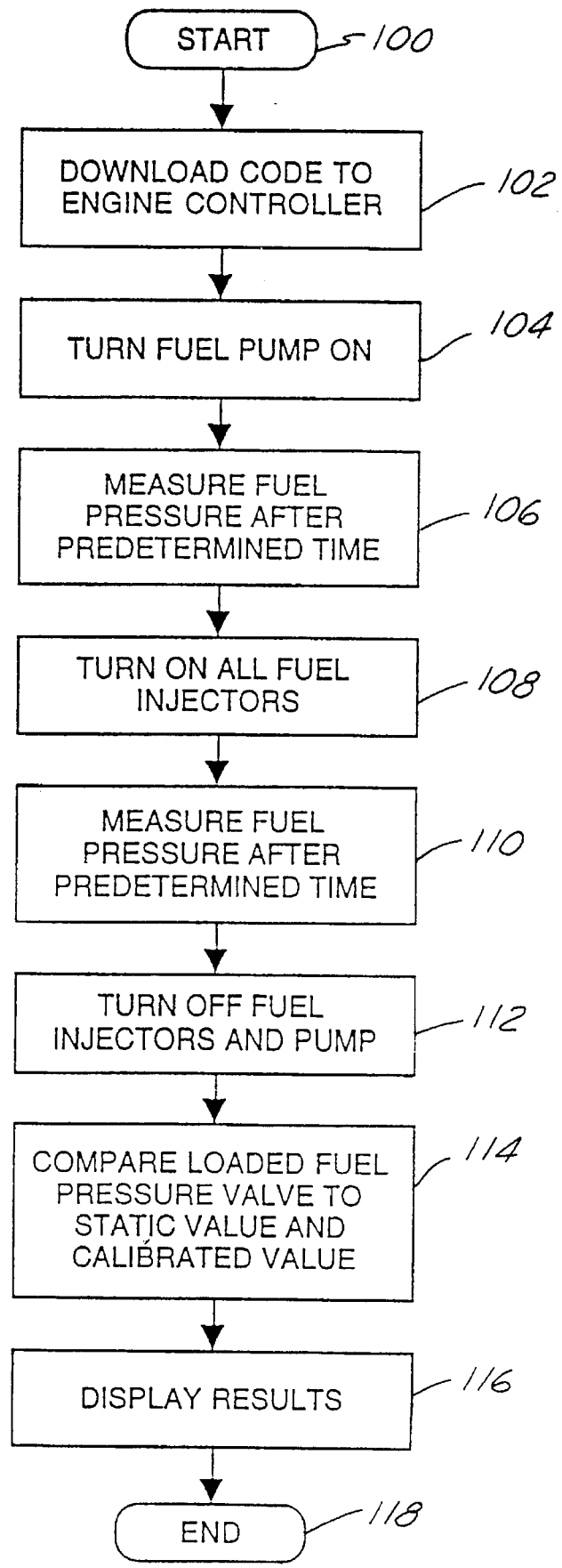
FIG. 3 is a flow diagram showing the steps for performing the fuel line integrity test of the present invention.

Turning now to FIG. 3, the fuel line integrity test begins at block 100 with the initiation of the test at computer 40. At block 102, computer code for controlling fuel system 10 is downloaded from computer 40 to a microprocessor in PCM 24. After the computer code has been downloaded and is executing, a control signal is sent from computer 40 to PCM 24 which then turns on fuel pump 14 (block 104) to pump fuel from tank 12 into fuel line 16, through filter 18, and past valve 32. At the start of the test, pressure builds within fuel line 16 and is regulated by regulator 22. After a predetermined period of time, approximately 5–20 seconds, and preferably approximately 10 seconds, to allow the fuel system to stabilize, particularly the fuel in fuel line 16, a pressure measurement is taken through Schrader valve 32 by transducer 36. The pressure signal is converted to an electrical analog representation and passed to computer 40 (block 106).

At block 108, on command from computer 40, PCM 24 turns all fuel injectors 20 to the opened position, thus allowing fuel flow from fuel line 16, through injector 20, and to pressure regulator 22, as shown in FIG. 1. Referring again to FIG. 3, fuel line pressure is again measured through transducer 36, as described above, after a predetermined amount of time, between approximately 0.3 to 0.7 seconds, and preferably 0.5 seconds, with fuel injectors 20 open (block 110). Such a time allows the pressure in fuel line 16 to stabilize before taking pressure measurements. In block 112, PCM 24 turns off fuel pump 14 and closes injectors 20 on command from computer 40. To prevent fuel build-up within the engine's cylinders, for example, in the event of a communication failure, PCM 24 "times out" after one second and turns off fuel pump 14 and fuel injectors 20.

In block 114, the measured fuel line pressures are displayed relative to calibrated pressures for an unobstructed fuel line under similar conditions. As used herein, the term "static condition fuel system pressure" means that fuel line pressure as measured in block 106 of FIG. 3, that is, the fuel line 16 pressure with fuel pump 14 turned on and injectors 20 closed. Likewise, the term "fully loaded condition fuel system pressure" as used herein means fuel line 16 pressure as measured in block 110 of FIG. 3, that is, fuel line 16 pressure when fuel pump 14 is operating and fuel injectors 20 have been opened for a predetermined period of time.

Still referring to FIG. 3, in block 114, the static condition fuel system pressure is compared with a calibrated static pressure for an unobstructed fuel line. As used herein, the term "calibrated static pressure" refers to fuel line 16 pressure as measured when fuel pump 14 is running with fuel injectors 20 in the closed position after a predetermined amount of time for a given model engine wherein it is known that fuel line 16 is unobstructed. Likewise, the term "calibrated fully loaded pressure" as used herein refers to fuel line 16 pressure as measured when fuel pump 14 is running with fuel injectors 20 in the open position after a predetermined amount of time for a given model engine wherein it is known that fuel line 16 is unobstructed.

Figure 4:
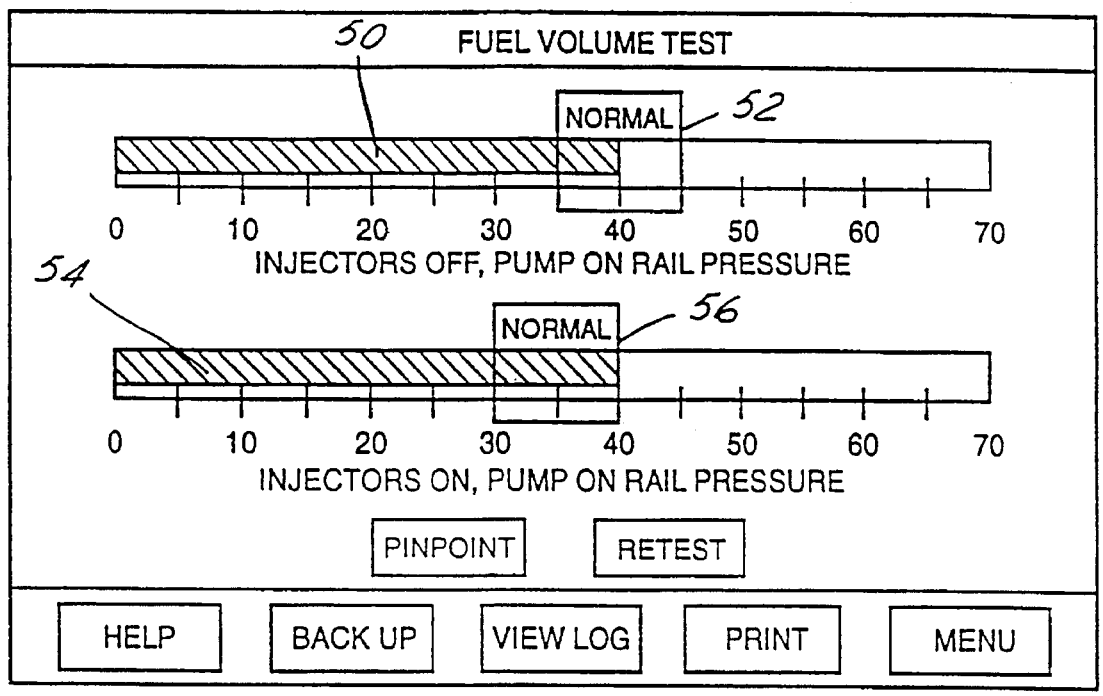
FIG. 4 is a view from a screen of a video display terminal graphically showing the test results of a fuel line integrity test according to the present invention.

In block 116, the measured values for the static condition fuel system pressure, the fully loaded condition pressure, the calibrated static pressure range, and the calibrated fully loaded pressure range are displayed on VDT 44. Such a display is shown in FIG. 4. The top graph shows fuel pressure horizontally and a crosshatched bar 50 indicates static condition fuel system pressure as measured in block 106 of FIG. 3. A range of static pressures for an unobstructed fuel line in a same model engine is shown by block 52 of FIG. 4 at the top graph (INJECTORS OFF, PUMP ON, RAIL PRESSURE). Thus, after conducting the test and viewing the displayed results on VDT 44, a service technician can quickly determine whether a measured static condition pressure, as shown by bar 50, is within an acceptable range, that is, within box 52. Box 52 represents the calibrated static pressures for an unobstructed fuel line. If bar 50 were below the acceptable range as indicated by box 52, corrective measures could be taken to further isolate the problem.

The second horizontal graph in the middle of FIG. 4 represents the comparison of the measured fully loaded pressure, as measured in block 110 of FIG. 3 with the range of calibrated fully loaded pressures for an unobstructed fuel line in a same model engine. Bar 54 represents the measured fully loaded condition fuel system pressure while box 56 represents the range of calibrated fully loaded pressures, which are acceptable for an unobstructed fuel line in a same model engine.

Figure 5A:
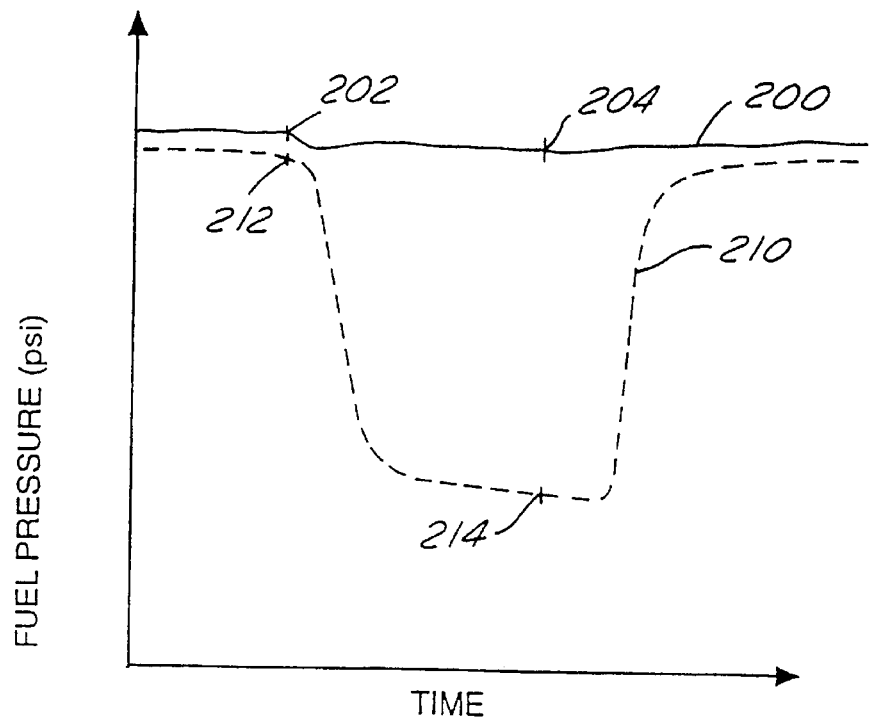
FIG. 5A is a graph illustrating fuel pressure history versus time for both an unobstructed fuel line and an obstructed fuel line for a same model engine.
Figure 5B:
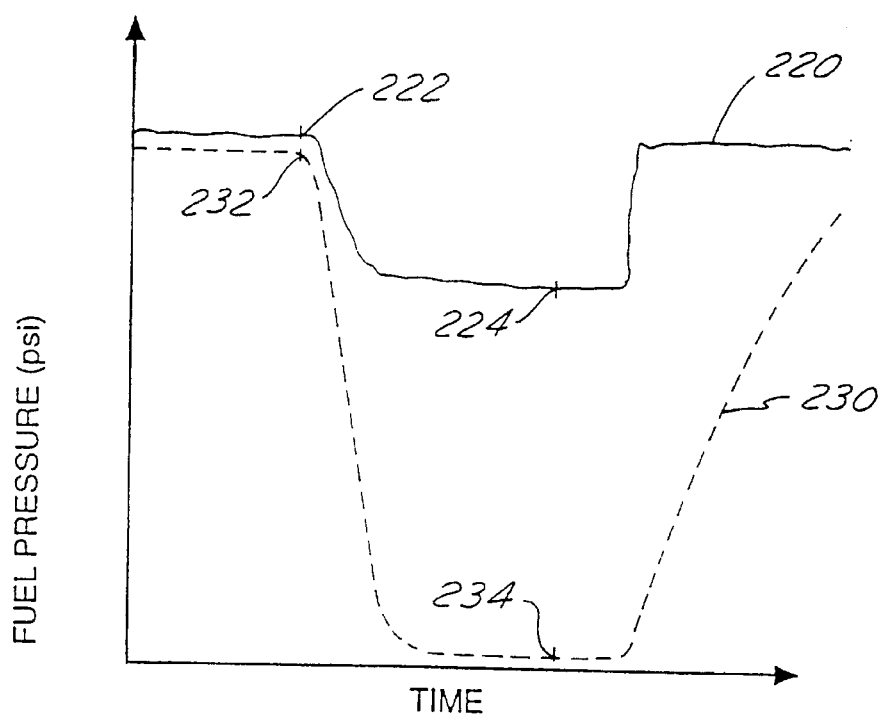
FIG. 5B is a graph similar to FIG. 5A, but for a different model engine, illustrating fuel pressure history versus time for both an unobstructed fuel line and an obstructed fuel line, and showing the fuel line pressure response variation among engines and fuel systems.

FIGS. 5A and 5B demonstrate the need for a range of acceptable static condition fuel pressures and fully loaded condition fuel system pressures when testing fuel line integrity. Referring specifically to FIG. 5A, line 200 depicts fuel line 16 pressure history during a fuel volume test according to the present invention. After turning on fuel pump and pressurizing fuel line 16 to the static condition with all fuel injectors 20 in the closed position, fuel line 16 pressure in the static condition is measured at point 202. Should bar 50 be outside the acceptable range, as indicated by block 52, a non-fuel volume related problem is indicated, such as a faulty pressure regulator 22 or an inoperative fuel pump 14. Other fuel system tests can be performed to isolate these problems.

Fuel injectors 20 are turned on after measurement of fuel line 16 pressure is taken at point 202. Approximately 0.3 to 0.7 seconds thereafter, and preferably approximately 0.5 second thereafter, another fuel line 16 pressure measurement is taken at point 204 just prior to injectors 20 being turned off by PCM 24. In a vehicle with an unobstructed fuel line 16, the pressure measurement at point 204 should be approximately the same value as the fuel pressure measurement taken at point 202, as line 200 in FIG. 5A shows.

Some vehicles, however, have a fully loaded condition fuel system pressure which may be 20% lower than the static condition fuel system pressure due to system design, for example, attributable to large flow rate injectors 20, or a small volume fuel pump 14. Such a situation is depicted in FIG. 5B. Line 220 shows the fuel line 16 pressure history for a fuel volume test according to the present invention on a fuel system having a small volume fuel pump. For the fuel system having the fuel line 16 pressure characteristic of line 220 in FIG. 5B, the acceptable range box 52 of the upper graphic in FIG. 4 would be widened to include such a variable range. Computer 40 contains a table of ranges for specific vehicles, and the specific vehicle being tested would be identified to computer 40 by the technician so that the appropriate range would be displayed on VDT 44.

Other fuel injector tests, including that disclosed in U.S. Pat. No. 5,020,362 (Hart, et al.), set a lower range of 95% of initial system pressure as the level under which the fuel delivery system is indicated as not operating properly (see specifically column 8, lines 26–69 Hart, et al.). Such tests, however, erroneously identify improperly operating fuel systems, thus causing excessive and unnecessary fuel system testing and repair. As an example, line 220 in FIG. 5B depicts an unobstructed fuel line 16 pressure history and would pass the fuel line volume test of the present invention, as it should. However, the fuel line 16 pressure history line 220 would cause the aforementioned other test to erroneously flag a properly operating fuel system.

Obstructed fuel line 16 pressure histories for the fuel systems of FIGS. 5A and 5B are depicted as lines 210 and 230, respectively. After fuel line 16 is pressurized, a fuel system pressure measurement is taken at points 212 and 232, respectively. PCM 24 then turns on all fuel injectors 20, as described above, and a second fuel line 16 pressure measurement is taken at points 214 and 234, respectively, just before fuel injectors 20 are turned off by PCM 24. Measured fuel system pressure at points 214 and 234, respectively, are displayed as bar 54 in FIG. 4, but would be outside, that is, to the left of, box 56, the normal acceptable range of fuel line 16 pressure values for the fuel system of the engine being tested.

Although the preferred embodiment of the present invention has been disclosed, various changes and modifications may be made without departing from the scope of the invention as set forth in the appended claims.

I claim:

1. A method for testing flow volume of a fuel line in a fuel injected internal combustion engine, the method comprising the steps of:

downloading control code from an electronic computer, external to the engine, to an engine control processor, said processor controlling a fuel pump and fuel injectors according to the control code during testing of the fuel line, said control code operative to cause said processor to operate said fuel pump and said fuel injectors at predetermined times;

initiating running of the control code within the engine control processor by sending a signal from the electronic computer external to the engine to the processor, said processor turning on the fuel pump connected to the fuel line with the engine fuel injectors closed to so as to pressurize fuel within the fuel line to a static condition;

connecting a pressure transducer to a schrader valve type connection in the fuel line between a fuel pump and fuel injectors in the engine;

measuring fluid pressure within the fuel line in the pressurized, static condition with the pressure transducer and sending a signal representing the measured static condition pressure to the electronic computer;

displaying the measured static condition pressure value and a range of predetermined static pressures for an unobstructed fuel line in a same model engine;

comparing the static condition fuel system pressure with the range of predetermined static pressures for an unobstructed fuel line in a same model engine;

opening all the fuel injectors simultaneously to allow fuel flow therethrough such that the fuel system is in a fully loaded condition;

measuring fluid pressure within the fuel line in the fully loaded condition with the pressure transducer approximately 0.3 seconds to 0.7 seconds after opening all fuel injectors and sending a signal representing the measured fully loaded condition pressure to the electronic computer;

displaying the fully loaded condition fuel line pressure and a range of predetermined fully loaded pressures for an unobstructed fuel line in a same model engine; and comparing the fully loaded condition fuel line pressure with the range of predetermined fully loaded pressures for an unobstructed fuel line in a same model engine.

2. A method according to claim 1, further including the step of measuring fuel system pressure in the fully loaded condition approximately 0.5 seconds after opening all fuel injectors.

3. A method according to claim 1, further including the step of displaying the measured static condition pressure value and a predetermined range of static pressures for an unobstructed fuel line in a same model engine on a display terminal.

4. A method according to claim 3, further including the step of displaying the measured fully loaded condition pressure value and a predetermined range of fully loaded condition pressures for an unobstructed fuel line in a same model engine on a display terminal.

5. A method according to claim 1, further including the step of measuring the static condition and fully loaded condition fuel line pressures with a pressure transducer.

6. A method according to claim 5, further including the step of connecting the pressure transducer to a schrader valve connection in the fuel line between the fuel pump and the fuel injectors.

7. A method for testing flow volume of a fuel line in a fuel injected internal combustion engine, the method comprising the steps of:

downloading control code from an electronic computer, external to the engine, to an engine control processor, said processor controlling a fuel pump and fuel injectors according to the control code during testing of the fuel line, said control code operative to cause said processor to operate said fuel pump between "on" and "off" states, said control code also operative to cause said processor to operate said fuel injectors between "open" and "closed" positions, so that external connections to said fuel pump and said fuel injectors are not necessary;

initiating running of the control code within the engine control processor by sending a signal from the electronic computer external to the engine to the processor, said processor turning the fuel pump to the "on" state and putting the fuel injectors in the "closed" position so as to pressurize fuel within the fuel line to a static condition;

measuring fluid pressure within the fuel line in the pressurized, static condition and sending a signal representing the measured static condition pressure to the electronic computer;

displaying the measured static condition pressure value and a range of predetermined static pressures for an unobstructed fuel line in a same model engine;

comparing the static condition fuel system pressure with the range of predetermined static pressures for an unobstructed fuel line in a same model engine;

sending a signal from the engine control processor directly to the fuel injectors to simultaneously put all the fuel injectors in the "open" position so that the fuel system is in a fully loaded condition;

measuring fluid pressure within the fuel line in the fully loaded condition approximately 0.3 seconds to 0.7 seconds after opening all fuel injectors and sending a signal representing the measured fully loaded condition pressure to the electronic computer;

displaying the fully loaded condition fuel line pressure and a range of predetermined fully loaded pressures for an unobstructed fuel line in a same model engine; and comparing the fully loaded condition fuel line pressure with the range of predetermined fully loaded pressures for an unobstructed fuel line in a same model engine.

* * * * *